US011865052B2

(12) United States Patent
Hamilton et al.

(10) Patent No.: US 11,865,052 B2
(45) Date of Patent: Jan. 9, 2024

(54) COLLAPSIBLE AEROSOL PARTICLE ENCLOSURE

(71) Applicant: Maine Medical Center, Portland, ME (US)

(72) Inventors: Elizabeth Hamilton, Portland, ME (US); Kaitlyn Main, Portland, ME (US); Samir Haydar, Cape Elizabeth, ME (US); David Eagleson, Sanford, ME (US); Paul Tyson, Biddeford, ME (US); Kara Held, Sanford, ME (US)

(73) Assignee: Maine Medical Center, Portland, ME (US)

( * ) Notice: Subject to any disclaimer, the term of this patent is extended or adjusted under 35 U.S.C. 154(b) by 215 days.

(21) Appl. No.: 17/236,821

(22) Filed: Apr. 21, 2021

(65) Prior Publication Data

US 2021/0322243 A1 Oct. 21, 2021

Related U.S. Application Data

(60) Provisional application No. 63/013,337, filed on Apr. 21, 2020.

(51) Int. Cl.
*A61G 10/00* (2006.01)
*A61G 10/02* (2006.01)

(52) U.S. Cl.
CPC ......... *A61G 10/005* (2013.01); *A61G 10/023* (2013.01)

(58) Field of Classification Search
CPC ..... A61G 10/02; A61G 10/005; A61G 10/023
See application file for complete search history.

(56) References Cited

U.S. PATENT DOCUMENTS 10,842,697 B1 11/2020 Comunale
2003/0116566 A1* 6/2003 Ellen .................. A61G 10/023 220/9.4

(Continued)

FOREIGN PATENT DOCUMENTS

WO 9108821 A1 6/1991
WO WO-1991008821 A1 * 6/1991 .......... B08B 15/026

(Continued)

OTHER PUBLICATIONS

International Search Report, PCT/US2021/028448, dated Jul. 29, 2021, pp. 2.

*Primary Examiner* — Thaddeus B Cox
(74) *Attorney, Agent, or Firm* — Armis IP Law, LLC

(57) ABSTRACT

A controlled access aerosolized particle enclosure for isolation of airborne contaminants includes a frame defining a patient isolation region over a patient bed. A linkage attaches the framed enclosure to a patient treatment vehicle, and a flexible elasticized barrier is suspended by the frame for enclosing the patient isolation region. The barrier is formed from deformable planer sheets of a flexible transparent material and extending adjacent to the patient treatment surface forming a draped edge around the bed or transport. A low pressure source is in fluidic engagement with the enclosure for reducing a pressure within the enclosure below that of ambient surroundings, such that the low pressure source provides a pressure for drawing the elasticized barrier against the patient treatment surface for restricting airborne particle passage from the enclosure to the ambient surroundings, but limits the negative pressure to avoid substantial deformation or collapse of the enclosure.

11 Claims, 4 Drawing Sheets

(56) References Cited

U.S. PATENT DOCUMENTS

| | | | | |
|---|---|---|---|---|
| 2006/0020159 | A1 | 1/2006 | Ellen | |
| 2015/0251119 | A1* | 9/2015 | Clavaguera | B01D 46/0005 29/244 |
| 2018/0163978 | A1* | 6/2018 | Ziegler | A61G 12/004 |

FOREIGN PATENT DOCUMENTS

| | | | | |
|---|---|---|---|---|
| WO | 2009045353 | A1 | 4/2009 | |
| WO | WO-2009045353 | A1 * | 4/2009 | A61G 10/005 |

* cited by examiner

COLLAPSIBLE AEROSOL PARTICLE ENCLOSURE

RELATED APPLICATIONS

This patent application claims the benefit under 35 U.S.C. § 119(e) of U.S. Provisional Patent App. No. 63/013,337, filed Apr. 21, 2020 entitled "COLLAPSIBLE AEROSOL PARTICLE ENCLOSURE" incorporated herein by reference in entirety.

BACKGROUND

Communicable diseases raise concern over interpersonal contact and a risk of disease transmission in proximity to others. Healthcare workers are acutely aware of the risk yet are compelled to engage in varying levels of contact for administering healthcare services. Different hazardous ailments present varying degrees of risk depending on a medium of transmission to others. Some diseases pass by touch, others by fluidic mechanisms such as saliva, and other can be passed by aerosolized means such as from an airborne release from sneezing, coughing or exhaling. The latter is generally deemed a higher risk potential than ailments that require physical touch to infect others.

SUMMARY

A portable, collapsible isolation enclosure engages a patient transport device such as a wheeled bed or ambulance cot for providing aerosolization separation for medical treatment personnel. An arrangement of transparent panels is supported by a rigid frame secured to an ambulance cot or other transport device by a detachable engagement that adapts to beds or transport devices of varying widths. A seam attaches semi-rigid sides to flexible front and back drapes of flexible plastic or similar disposable material for facilitated access in an exigent situation.

The aerosol particle enclosure provides an isolated environment for patients with diseases that are at high risk of aerosolization, a process which puts health care workers at risk of nosocomial infection, especially in a setting where there is a shortage of optimal personal protective equipment, while still allowing for supportive care including aerosol generating procedures, nebulized medications, high-flow nasal cannula, and non-invasive positive pressure ventilation.

Configurations herein are based, in part, on the observation that incoming patients to a medical treatment regime typically present an unknown risk of disease for ailments the patent may harbor. Unfortunately, conventional approaches to a medical intake protocol suffer from the shortcoming of imposing a substantial overhead of full body protection suits and pressure controlled treatment areas if an unknown risk of contamination is present. A requirement that all incoming patients be routed through a vapor/airborne containment approach is cumbersome and time consuming. Accordingly, configurations herein substantially overcome the above shortcomings by providing a portable isolation environment that mitigates substantially all aerosolization risks with incoming patients and follows the patient transport vehicles from ambulance, to ER (emergency room) intake and on to patient rooms.

In a particular configuration, in a patient treatment environment such as a hospital, a controlled access aerosolized particle enclosure for isolation of airborne contaminants includes a frame forming a framed enclosure defining a patient isolation region over a patient treatment surface such as a bed. A linkage attaches the framed enclosure to a patient treatment vehicle, and a flexible elasticized barrier is suspended by the frame for enclosing the patient isolation region. The barrier is formed from deformable planer sheets of a flexible transparent material and extending adjacent to the patient treatment surface forming a draped edge around the bed or transport. A low pressure source is in fluidic engagement with the enclosure for reducing a pressure within the enclosure below that of ambient surroundings, such that the low pressure source provides a pressure for drawing the elasticized barrier against the patient treatment surface for restricting airborne particle passage from the enclosure to the ambient surroundings, but limits the negative pressure to avoid substantial deformation or collapse of the enclosure.

In other configurations, the enclosure has a pair of opposing sheets of a flexible transparent planar material, and a pair of opposing sheets of a deformable transparent material, forming the appearance of a cube around the head and upper torso of a patient on a hospital bed. The enclosure is adapted to provide a barrier to aerosolized contaminants from the plastic composition of the sheets. Other impenetrable surface materials may also be employed.

A rigid frame defines a three dimensional rectangular or cube shape surrounded by the opposed sheets, and the enclosure also employs a top surface sized to fit over the framed enclosure. The side panels parallel to the side of the bed are a rigid but flexible construction, and employ an opening or slit in the side for treatment access. The opening is defined by a releasable seam such as a zipper along at least one sheet of the flexible transparent material which is releasable for access to an interior surrounded by the framed enclosure. The opening or slit remains closed when not in use for treatment. Front and back panels are flexible drapes that may be lifted or reached under for access. A detachable seam between the flexible transparent planar material and the deformable transparent planar material allows the flexible drape to be changed on a single-use basis. A detachable linkage on the rigid frame is adapted to engage the patient transport vehicle, and adapts to the different widths of the beds/cots that may be employed. Ambulance cots have a narrower width than hospital beds, which also vary between the ER (Emergency room/department) and beds patient rooms.

In operation, the enclosure may transfer between different vehicles as the patient is integrated into the hospital admission cycle, such as from ambulance, to transport bed or wheelchair, and onto a patient room bed if admitted. The detachable linkage of the enclosure is adapted to engage patient transport vehicles of different widths through telescoping, articulating, or flexible members defining the rectangular frame shape.

The deformable transparent material on the front and back is more of a drape that may be folded or moved aside for patient access, and may be less rigid than the flexible transparent material flanking the sides. The deformable transparent material is foldable for providing access to the interior.

Particular configurations employ an air exchange device on the enclosure, such as fan driven forced air evacuation device, for maintaining a pressure differential in the interior to further mitigate air/gaseous/vapor transfer that may carry infectious droplets or particles.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
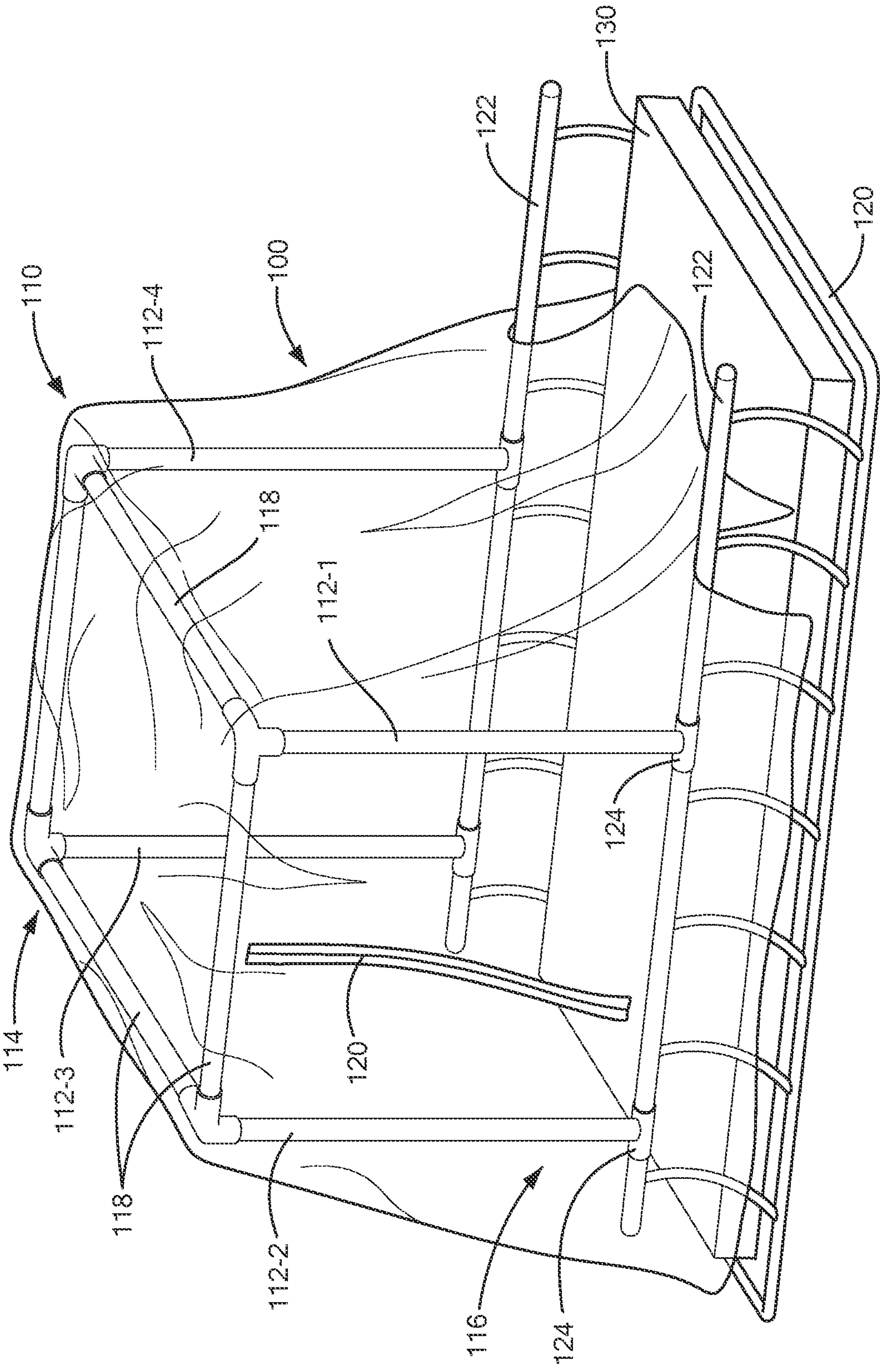
FIG. 1 is a perspective view of a configuration of the airborne contaminants barrier apparatus.

Configurations below describe implementation of an encapsulating barrier over a patient for preventing spread of aerosolized and airborne particles such as droplets that may contain infection material, which is typically of high concern when a suspected infectious patient coughs or sneezes, however some contaminants can be broadcast merely by being exhaled. The enclosure has the appearance of tent formed from transparent sheet or planer material, with an exhaust or air suction system for providing a slight negative pressure inside the enclosure that prevents escape of airborne contaminants. The enclosure surrounds the patient and the bed to form a perimeter that establishes an engagement with the enclosure from the slight negative pressure, but having only a mild pressure difference so as not to draw in the enclosure around the patient. Access ports have a draped overlapping panel to avoid a complete, unmitigated opening such that the pressure gradient is lost.

The novel coronavirus (2019-nCoV) pandemic has highlighted the concern of nosocomial dispersion and increased risk to healthcare providers. As it stands, there is a mismatch between the resources needed to keep healthcare providers and patients alike safe from the risk associated with communicable disease such as 2019-nCoV leading to unprecedented levels of morbidity and mortality. This and similar ailments present a risk of aerosolized or airborne contaminants to healthcare workers, particularly in an absence of other PPE (Personal Protection Equipment) such as gloves, gowns, and sufficient masks. Configurations herein provide an easily deployable solution designed to not only fill the current gap but also to provide a mechanism applicable to future needs.

Current understanding of the transmission of 2019-nCoV suggests spread via droplets as well as direct contact and fomite. Current recommendations for health care providers working with patients with confirmed or suspected 2019-nCoV infection include fit-tested particulate respirators during any procedure that might generate aerosols (World Health Organization, 2020). Recommendations also include so-called negative pressure rooms for patients requiring these procedures and thereafter.

Further, in a sudden epidemic or pandemic situation, many hospitals may experience a deficiency in PPE. Given developing understanding of disease transmission, practices and guidelines within each medical community have changed over the course of several months, also fluctuating with the supply. While there has been an increase in production of PPE in the US, there are many settings in which appropriate PPE is not available for health care providers. Configuration herein provide another method and apparatus of aerosolized viral containment to reduce the likelihood of nosocomial spread. This may be more impactful in health care settings where PPE is a limited resource.

In contrast to conventional approaches, the disclosed approach affords full, unencumbered caregiver access while maintaining the pressure gradient to achieve at least a small vacuum, or lower pressure, within the enclosure to prevent the escape of airborne or aerosolized particles, which could potentially transmit infection. Conventional approaches include those disclosed in EP 0619108 A1, depicting an enclosure with a negative pressure space encompassing the patient's bed, but with insufficient access for proper treatment. Another, U.S. Pat. No. 7,479,103 B2 shows a portable isolation enclosure for patients at high risk of eloping from their bed when it was unsafe for them to do so. Although it suggests capabilities for positive and negative pressure, it does not easily allow for procedures to be performed under these circumstances. US 20160136024 A1 depicts a method for containing contagious microbes from patients, but requires multiple gloved hands for accessing a patient at various intervals in the rectangular enclosure.

FIG. 1 is a perspective view of a configuration of the airborne contaminant barrier apparatus. An enclosure 100 takes the form of a flexible sheet of transparent planar material draped over a frame 110. The frame 110 further includes a plurality of vertical uprights 112-1 . . . 112-4 (112 generally) defining a rectangular shape, such that each of the vertical uprights has an upper end 114 and a lower end 116. A plurality of transverse members 118 connect the upper end of each of the vertical uprights 112. A vertical seam 120 provides an access port for patient care.

The frame 110 attaches to a patient transport vehicle 120 supporting a patient treatment surface 130 such as a mattress. The transport vehicle 120 has rails 122 where attachments or linkages 124 join the vertical uprights 112.

Figure 2:
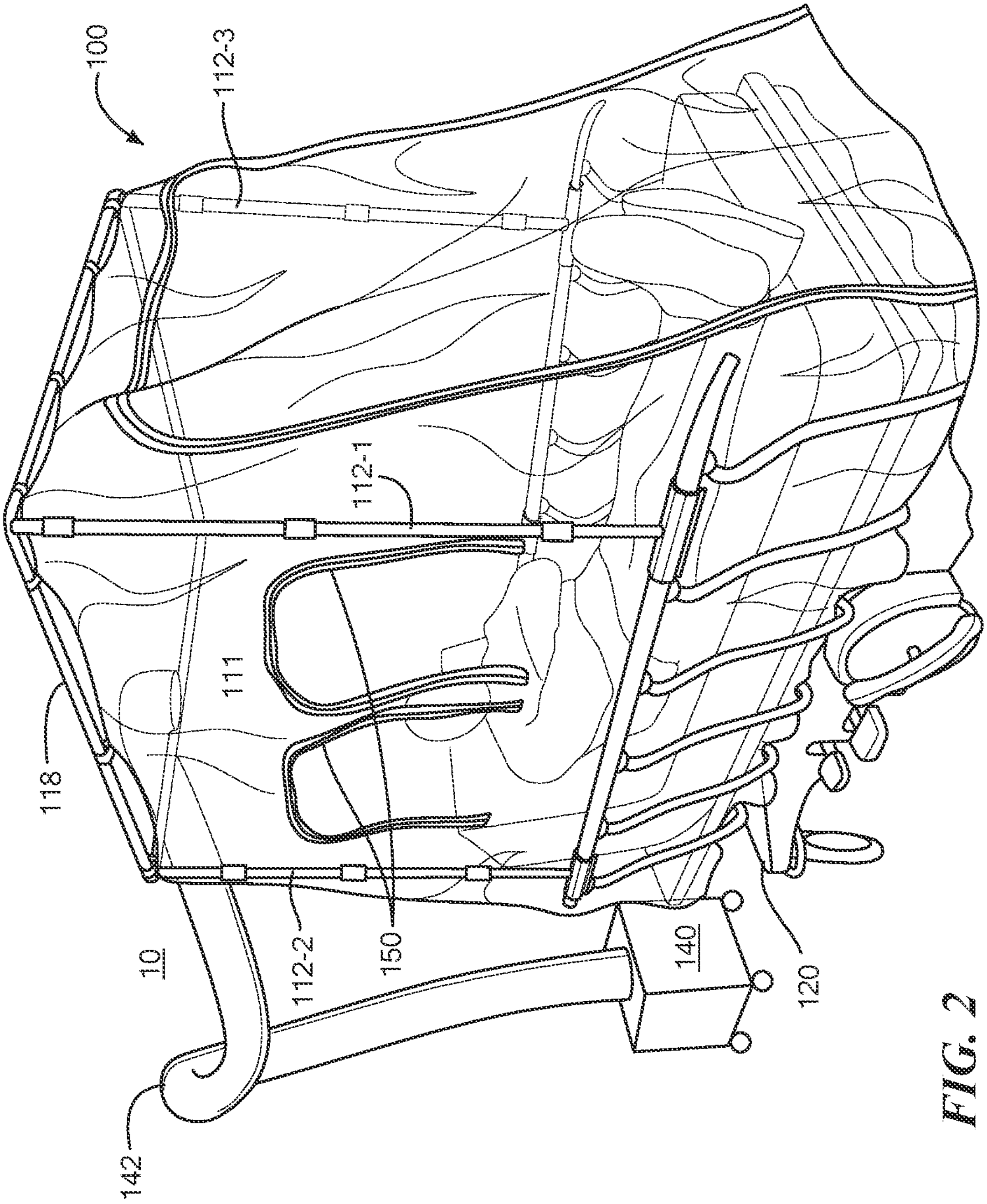
FIG. 2 is a perspective view of a airborne contaminants barrier with a pressure gradient.

FIG. 2 is a perspective view of a airborne contaminant barrier with a pressure gradient. In a patient treatment environment 10, a controlled access aerosolized particle enclosure 100 (enclosure) is for isolation of airborne contaminants. The frame 110 forms a framed enclosure defining a patient isolation region 111 having a patient treatment surface 130. A linkage 124 attaches the framed enclosure to the patient treatment vehicle 120. A flexible elasticized barrier forms the enclosure 100 suspended by the frame 110 enclosing the patient isolation region 111. The barrier is generally formed from deformable planer sheets of a flexible transparent material and extends downward in a draping manner adjacent to the patient treatment surface 130. Separable seams 150 define access ports for patient care, discussed further below.

The material defining the enclosure 100 is a transparent, flexible material such as an elasticized PVC (Polyvinyl Chloride, made with a plasticizer) without harmful effects of outgas sing or leaching. It also has a flexibility that is beneficial towards establishing a low pressure seal or engagement against the patient treatment surface 130, discussed further below.

A low pressure source 140 is in fluidic engagement with the enclosure 100 via a suction tube 142 for reducing a pressure within the enclosure below that of ambient surroundings, such that the low pressure source 140 provides a pressure for drawing the elasticized barrier against the patient treatment surface 130 for restricting airborne particle passage from the enclosure to the ambient surroundings. The low pressure source 140 allows the enclosure 100 to drape with gravitational force that is less than the negative pressure source to maintain engagement with sides of base without pulling substantially inward into the patient isolation region 111 inside the enclosure 100. The PCV therefore provides an elasticized plastic for suction driven closure around the patient bed.

In the example configuration, the low pressure source 140 provides a suction force that directs airborne particles to the low pressure source for subsequent filtration. The low pressure source provides a suction force for drawing the elasticized barrier (enclosure 100) against the patient treatment surface 130 for maintaining a negative pressure within the enclosure and retaining the enclosure from incursion into the patient isolation region 111 by deformation of the elasticized barrier, as might occur with excessive exhaust pressure within the enclosure 100.

Figure 3:
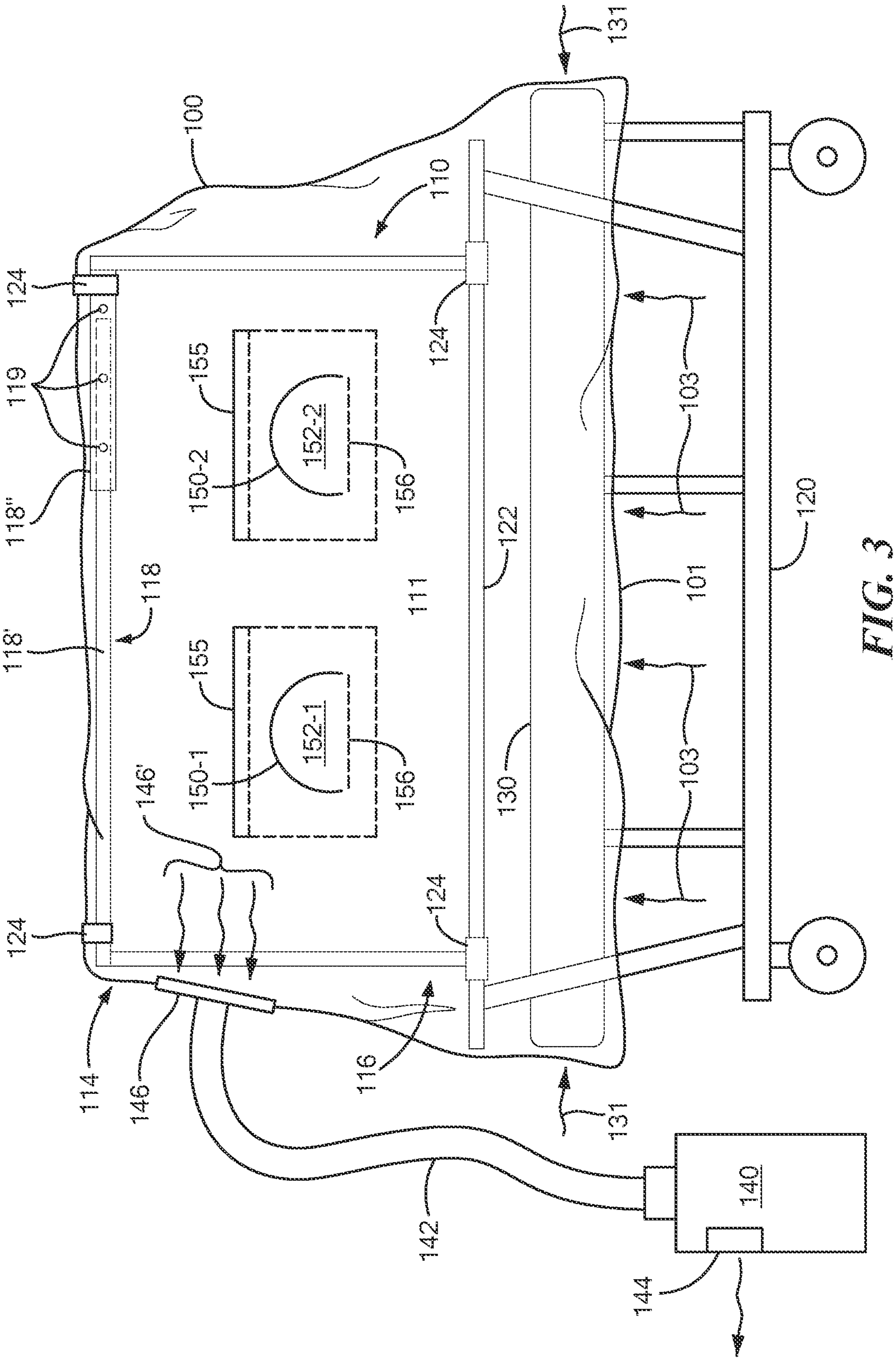
FIG. 3 is a schematic view of the enclosure defined by the apparatus in FIGS. 1 and 2.

FIG. 3 is a schematic view of the enclosure defined by the apparatus in FIGS. 1 and 2, depicted as a side elevation similar to FIG. 2. Referring to FIGS. 1-3, the enclosure further includes at least one access port 152-1 . . . 152-2 (152 generally) on the elasticized barrier defining the enclosure 100. Each access port 152 including an inner drape 154-1 . . . 154-2 (154 generally) attached to an inner surface of the elasticized barrier at an overlapping portion via a seam 155. Separable seams 150-1 . . . 150-2 (150 generally) in the elasticized barrier align with the overlapped portion, shown by the dotted line outline of each respective inner drape 154. The separable seams 150 form flaps that are continuous with the elasticized barrier along a bottom edge 156 and configured for release for folding downward.

An attachment or linkage 124 extends from the transverse members 118 to the elasticized barrier for supporting the elasticized barrier in a draped manner over a patient treatment surface. The attachment extends from the lower end 116 of each of the vertical uprights 112, such that the attachment 124 is configured for engagement with the patient vehicle 120. Typically, the patient vehicle has rails 122, and is defined by an ER (emergency room, or emergency department) bed, hospital bed, ambulance bed or wheelchair. A telescoping linkage in at least two of the transverse members 118 and vertical uprights 112 allows for adjustment of a dimension of the rectangular shape. The telescoping linkage is defined by a segment 118' of a lesser diameter and a segment 118" of a greater diameter, where the lesser diameter segment 118' is operable for slidable communication into the larger diameter segment 118" to effectively vary the length of the transverse member 118. Apertures 119 and spring loaded buttons provide an interference fit for locking the transverse member at desired increments. Patient transport vehicles 120 of varying lengths and widths may be accommodated to keep the uprights 112 from excessive flexing, while the draped enclosure 100 is sufficiently flexible to accommodate by allowing the draped edge 101 to extend below the patient treatment surface 130 for providing the low pressure engagement or seal.

The low pressure source 140 further includes a forced ventilation pump for maintaining a negative pressure between −0.01 to −0.07 inches WC (water column), and a filter 144 adapted to retain at least 99.5% of particles 0.3 um or larger. Other suitable ranges may be employed. The low pressure source 140 may be fan driven, and draws air from the enclosure 100 via a portal 146 to the suction tube 142. Airflow occurs as shown by arrows 146', which draw air out through the filter 144. The net result is to gently draw air in around the draped edge 101, shown by arrows 103, which provides a moderated suction for engaging the draped edge 101 around the perimeter of the patient treatment surface 130, shown by arrows 131.

Various configurations of contaminant filtration and airflow may be achieved by balancing the pressure imposed on the draped edge 101 and the parameters of the filter 144. The low pressure source 140 should be able to accommodate access via one or more of the access ports 152, discussed in further detail in FIGS. 4A-4D below. In a particular configuration, Table I gives example parameter values for the low pressure source 140. In particular, it may be beneficial if the low pressure source 140 is adapted to achieve a particle clean out by exchanging a full volume of the enclosure in 4 minutes or less.

TABLE I

| Particle size | | 0.5 um | 0.3 um |
|---|---|---|---|
| ER bed | Both arm ports open | 99.77% | 99.50% |
| | Head of bed unzipped, arms in | 99.78% | 99.54% |
| | Head of bed, fully open | 99.80% | 99.58% |
| Hospital bed | Both arm ports open | 99.99% | 99.98% |
| | Head of bed unzipped, arms in | 99.95% | 99.98% |
| | Head of bed, fully open | 99.87% | 99.78% |

Figure 4D:
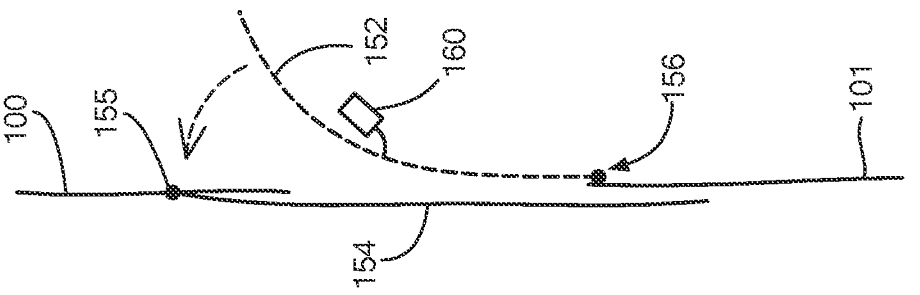
FIGS. 4A-4D show a pressure gradient preserving access port to the enclosure of FIGS. 1-3.
Figure 4C:
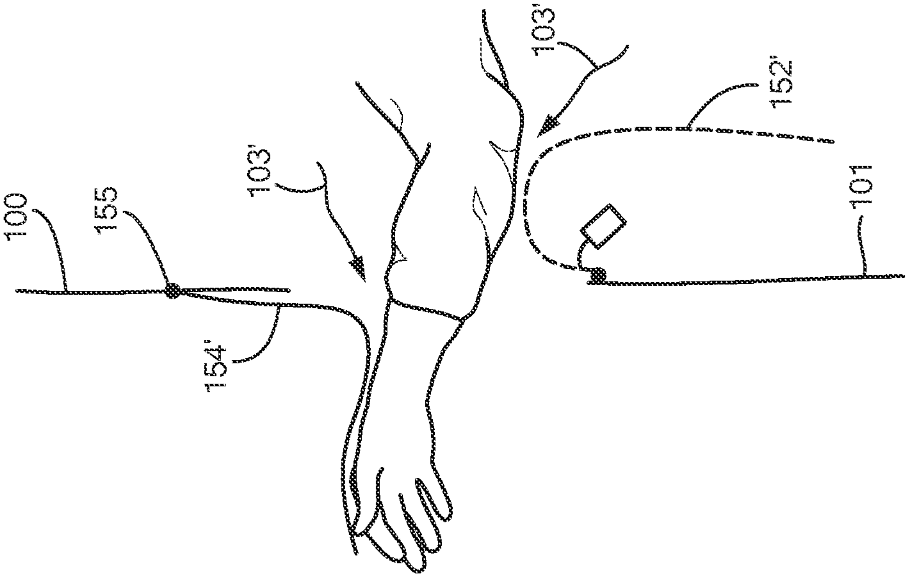
Figure 4B:
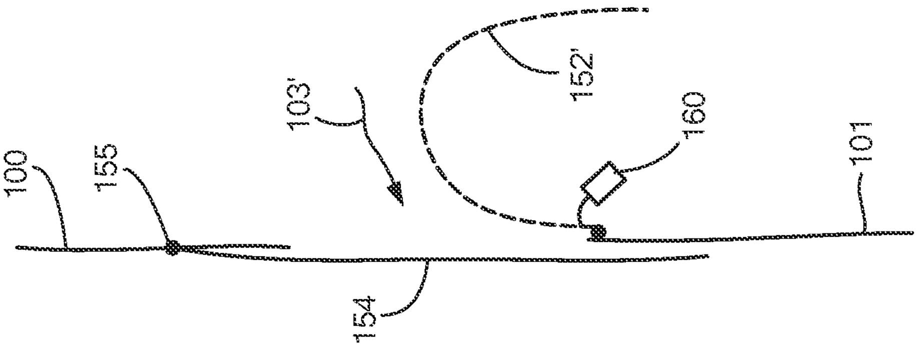
Figure 4A:
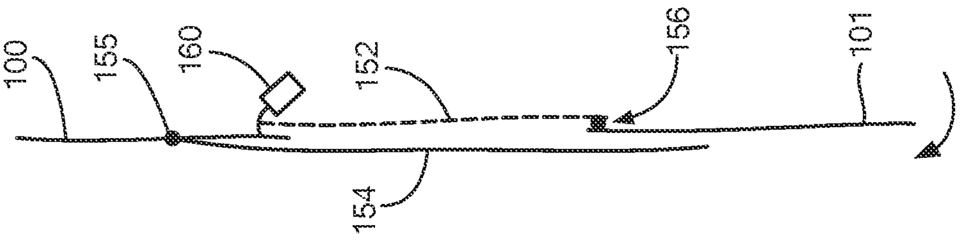

FIGS. 4A-4D show a pressure gradient preserving access port to the enclosure of FIGS. 1-3. Referring to FIGS. 3 and 4, the separable seams 150 define access ports 152 which allow intervention for caretaker access, typically an arm and hand of a caregiver for patient care access. In FIG. 4A, a cross sectional view of the access port 152 region is shown. The enclosure 100 extends to the draped edge 101 where it engages the patient treatment surface 130. The inner drape 154 attaches at a fusion or seam 155, and drapes downward opposite the access port 152, which is secured by the separable seam 150. The inner drape 154 extends blow a bottom edge 156 of the access port.

The separable seam 150 is a controlled separation where a flap or portion of the enclosure 100 may be separated, typically fulfilled by a zipper, adhesive, magnetic or similar coupling. When detached, as shown in FIG. 4B, the separable seam defines a flap 152' in the elasticized barrier. A small quantity of airflow 103' may be permitted, however the inner drape 154 extending below the bottom edge mitigates any freely open conduit for ambient air. When secure, an uppermost segment of the separable seam 150 is disposed below an attachment seam 155 of the inner drape 154 to the inner surface of the elasticized barrier. In other words, the inner drape 154 overlaps and obscures any opening the access port 152 formed when the separable seam 150 is detached.

In the examples of FIG. 4B, the separable seam 150 is a zipper actuated by a tab 160 around an annular shape defining a discontinuity in the elasticized barrier, in which the overlapped portion extends from the attachment seam 155 to the elasticized barrier to below the bottom edge 156 in an undeformed, draped state, such that the discontinuity is sufficiently large for accommodating an arm of a caregiver.

FIG. 4C shows caregiver access extending through the access port 152 and deformed inner drape 154' which permits access. While the deformed inner drape affords access, additional airflow 103' unavoidable enters, however allows negative pressure to be maintained in the enclosure 110. Once patient intervention is complete, shown in FIG. 4D, caregiver arms are retracted and the inner drape freely falls back to obscure the access port 152. Shortly thereafter, the zipper tab 160 reengages the separable seam 150 as the flap 152' is reattached 152. It should be noted that the semicircular path shown would cause the zipper tab to travel the semicircular outline of the seam 150 and thus would appear near the bottom edge 156 in either the fully open or fully closed position.

In terms of fluid mechanics, it is expected that the low pressure source provides a suction force within the framed enclosure that remains less than or equal to −0.01 WC during two handed access to the enclosure 100 through the flapped openings when the seam 150 is disengaged. Overall, a negative pressure between −0.01 to −0.07 inches WC is expected to maintain a balance that restricts airborne contaminants without causing substantial deformation or implosion of the enclosure from excessive pressure.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a patient treatment environment, a controlled access aerosolized particle enclosure device for isolation of airborne contaminants, comprising:

a frame defining a patient isolation region having a patient treatment surface;

a linkage for attaching the frame to a patient treatment vehicle;

a flexible barrier defining an enclosure suspended by the frame enclosing the patient isolation region, the barrier formed from deformable planar sheets of a flexible transparent material and extending adjacent to the patient treatment surface;

a low pressure source in fluidic engagement with the enclosure for reducing a pressure within the enclosure below that of ambient surroundings, the low pressure source providing a pressure for drawing the flexible barrier against the patient treatment surface for restricting airborne particle passage from the enclosure to the ambient surroundings, the low pressure source providing a suction force for drawing the flexible barrier against the patient treatment surface for maintaining a negative pressure within the enclosure while retaining the enclosure from deformation and incursion into the patient isolation region; and at least one access port on the flexible barrier, the at least one access port including:

an inner drape attached to an inner surface of the flexible barrier at an overlapping portion; and a separable seam in the flexible barrier along the overlapping portion, the separable seam continuous with the flexible barrier along a bottom edge and configured for release for folding downward.

2. The device of claim 1 wherein the low pressure source provides a suction force that directs airborne particles to the low pressure source for subsequent filtration.

3. The device of claim 1 wherein the separable seam defines a flap in the flexible barrier, an uppermost segment of the separable seam disposed below an attachment of the inner drape to the inner surface of the flexible barrier.

4. The device of claim 1, wherein the separable seam is a zipper around an annular shape defining a discontinuity in the flexible barrier, the overlapping portion extending from an attachment to the flexible barrier to below the bottom edge in an undeformed, draped state, the discontinuity sufficiently large for accommodating an arm of a caregiver.

5. The device of claim 1 wherein the frame further comprises:

a plurality of vertical uprights defining a rectangular shape, each vertical upright of the vertical uprights having an upper end and a lower end;

a plurality of transverse members, each transverse member connecting to the upper end of at least one of the vertical uprights;

an attachment from the plurality of transverse members to the flexible barrier for supporting the flexible barrier in a draped manner over the patient treatment surface;

a telescoping linkage in at least two of the plurality of transverse members for adjusting a dimension of the rectangular shape.

6. The device of claim 5 further comprising an attachment from the lower end of each of the plurality of vertical uprights, each respective attachment configured for engagement with the patient treatment vehicle.

7. The device of claim 1 wherein the low pressure source further comprises:

a forced ventilation pump for maintaining a negative pressure between −0.01 to −0.07 inches WC (water column); and a filter adapted to retain at least 99.5% of particles 0.3 μm or larger.

8. The device of claim 7 wherein the low pressure source is adapted to achieve a particle clean out by exchanging a full volume of the enclosure in 4 minutes or less.

9. The device of claim 1, wherein the low pressure source provides a suction force within the enclosure that remains less than or equal to −0.01 WC during two handed access to the enclosure through the at least one access port.

10. The device of claim 1 wherein the patient treatment vehicle and patient treatment surface further comprise at least one of an ED (Emergency Department) bed, hospital bed, ambulance bed and wheelchair.

11. The device of claim 1 wherein the inner drape overlaps and obscures an opening defined by the at least one access port.

* * * * *